United States Patent
Hahn et al.

(10) Patent No.: US 7,073,324 B2
(45) Date of Patent: Jul. 11, 2006

(54) DEVICE AND METHOD FOR DETERMINING THE NEED FOR REGENERATION IN A $NO_x$ STORAGE CATALYST

(75) Inventors: Hermann Hahn, Hannover (DE); Michael Lindlau, Braunschweig (DE); Sören Hinze, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 214 days.

(21) Appl. No.: 10/203,871

(22) PCT Filed: Jan. 12, 2001

(86) PCT No.: PCT/EP01/00335

§ 371 (c)(1), (2), (4) Date: Aug. 27, 2002

(87) PCT Pub. No.: WO01/61162

PCT Pub. Date: Aug. 23, 2001

(65) Prior Publication Data

US 2003/0115858 A1   Jun. 26, 2003

(30) Foreign Application Priority Data

Feb. 17, 2000  (DE) ................. 100 07 048

(51) Int. Cl.
*F01N 3/00* (2006.01)

(52) U.S. Cl. ............... 60/295; 60/274; 60/285; 60/297

(58) Field of Classification Search .......... 60/274, 60/277, 285, 295, 297
See application file for complete search history.

(56) References Cited

U.S. PATENT DOCUMENTS

| 5,437,153 | A  | * | 8/1995  | Takeshima et al. ........... 60/276 |
| 5,992,142 | A  | * | 11/1999 | Pott ............................. 60/274 |
| 6,032,461 | A  | * | 3/2000  | Kinugasa et al. ............. 60/295 |
| 6,188,944 | B1 | * | 2/2001  | Kolmanovsky et al. ....... 701/54 |
| 6,244,047 | B1 | * | 6/2001  | Brehob et al. ................ 60/295 |
| 6,467,258 | B1 | * | 10/2002 | Jobson et al. ................. 60/285 |

FOREIGN PATENT DOCUMENTS

| DE | 195 36 098 | 4/1996 |
| DE | 196 22 832 | 12/1996 |
| DE | 40 42 562  | 4/1997 |
| DE | 196 36 790 | 3/1998 |
| DE | 197 53 718 | 7/1999 |
| DE | 198 11 257 | 9/1999 |
| DE | 198 44 475 | 12/1999 |

* cited by examiner

*Primary Examiner*—Binh Q. Tran
(74) *Attorney, Agent, or Firm*—Norris McLaughlin & Marcus PA

(57) ABSTRACT

The invention relates to a device and method for determining the need for regeneration in a $NO_x$ storage catalyst (18) arranged in the exhaust train (12) of an at least periodically lean-operating internal combustion engine (10) for a motor vehicle. According to the invention, the need for regeneration is determined according to the engine power (P) of the internal combustion engine (10) and the remaining $NO_x$ storage capacity of the $NO_x$ storage catalyst.

13 Claims, 2 Drawing Sheets

DEVICE AND METHOD FOR DETERMINING THE NEED FOR REGENERATION IN A $NO_x$ STORAGE CATALYST

BACKGROUND OF THE INVENTION

The invention relates to a device and method for determining the need for regeneration in a $NO_x$ storage catalyst arranged in the exhaust the channel of an at least-temporarily lean-running internal combustion engine for a motor vehicle.

Modern combustion engines are preferably operated under lean conditions to optimize fuel consumption. Under these conditions, a specific fuel consumption has typically a minimum. This minimum occurs, for example, for gasoline engines at an air-fuel ratio of approximately $\lambda=1.1$ (gasoline engines with direct fuel-injection can have lambda values approaching $\lambda=4.5$ and Diesel engines can have lambda values approaching $\lambda=8$). Under certain driving conditions, operating the motor vehicle requires maximum torque from the internal combustion engine (for example, kick-down, acceleration). The internal combustion engine supplies a maximum torque at an air-fuel ratio of $\lambda=0.95$ to $0.98$, which disadvantageously lies outside the operating range where the fuel consumption is optimized.

The pollutants emitted by the internal combustion engine are mainly dependent on the air-fuel ratio in the combustion process. If an air-fuel mixture is burned under rich conditions ($\lambda<1$), then the quantity of naturally reducing pollutants, such as carbon monoxide CO and unburned hydrocarbons HC, increases significantly. On the other hand, the formation of nitrous oxides $NO_x$ is enhanced when changing to a lean atmosphere. The formation of $NO_x$ goes through a maximum, which lies approximately in the range where the fuel consumption of the internal combustion engine is optimized. Accordingly, if the internal combustion engine runs at least temporarily under lean conditions to reduce fuel consumption, then a high $NO_x$ emission level has to be tolerated.

It is also known to clean the exhaust gas produced in the combustion process and pass the exhaust gas through catalysts arranged in the exhaust channel of the internal combustion engine. Under rich conditions, the reducing agents HC, CO can then at least temporarily almost completely react with the remaining residual or stored oxygen on the so-called oxidation catalysts. The emission of pollutants can be reduced by a substantial amount under stoichiometric conditions through the use of so-called three-way catalysts, which have an additional catalyst component supporting the reduction of $NO_x$. $NO_x$ is then reacted with the reducing agents HC, CO.

The required mass flows of the reduction agents (HC and CO mass flows) are too small under lean conditions, i.e., in particular in the range around $\lambda=1.1$ where fuel consumption is optimized, to enable a complete reduction of the $NO_x$ emission. It is the therefore known to associate with the reduction catalyst a $NO_x$ absorber ($NO_x$ storage catalyst), which stores the $NO_x$ until a sufficient quantity of reducing agents can again be provided. Such $NO_x$ storage catalyst has, of course, a finite storage capacity and needs to be regenerated in regular intervals by exposing the $NO_x$ storage catalyst to a rich or stoichiometric exhaust gas. Such process should be controlled so as to, on one hand, minimize a $NO_x$ breakthrough emission caused by an depleted storage capacity and, on the other hand, ensure that the operation under rich or stoichiometric conditions with unfavorable fuel consumption is not forced more often than necessary.

It is therefore known to control the regeneration by defining a need for regeneration based, for example, on the $NO_x$ breakthrough emission measured downstream of the $NO_x$ storage catalyst. If this emission exceeds, for example, a predetermined threshold value, then the aforedescribed actions are initiated. However, such an inflexible definition of the need for regeneration can unnecessarily increase the fuel consumption under certain operating conditions. For example, acceleration processes can also be performed under lean conditions where fuel consumption is optimized. It therefore makes little sense to perform a regeneration only in a subsequent driving phase at an approximately constant speed or with a small load, because the relatively low mass flow of the reducing agents can then prolong the regeneration. Moreover, the difference in fuel consumption between lean operating conditions and corresponding stoichiometric or rich operation is greater with smaller loads than with heavier loads.

SUMMARY OF THE INVENTION

It is therefore an object of the present invention to provide a device and a method whereby the need for regeneration can be adapted by taking into consideration an engine power of the internal combustion engine, since such an adaptation of the need for regeneration lowers the fuel consumption.

The aforedescribed disadvantages of the present technology can be overcome with the device and the method for determining the need for regeneration of the $NO_x$ storage catalyst having the features recited in the independent claims. By determining the need for regeneration as a function of the engine power of the internal combustion engine and a remaining $NO_x$ storage capacity of the $NO_x$ storage catalyst, a change into the regeneration mode can be forced, for example, during those acceleration phases of the motor vehicle that under conventional operating standards would still be performed under lean conditions.

The device includes means for determining the need for a regeneration. These means include a control device which stores a procedure for determining the need for regeneration in digitized form. The control device can be integrated in an already existing engine controller.

The engine power by which the need for regeneration is determined can be ascertained using known models. Both an instantaneous engine power as well as a projected engine power, which is attained after a predetermined time horizon, and the gradient of the engine power during this time horizon can be taken into consideration. The latter two quantities can be computed, in particular, from certain parameters, such as a driving condition, an acceleration gradient, a position of the accelerator pedal and an actual gear ratio.

Preferably, the need for regeneration is determined by taking also into account the acceleration gradient during a predetermined time interval as well as the accelerator pedal position. Advantageously, the actual gear ratio as well as a driving condition can also be considered. The need for regeneration can thereby become more probable for certain driving conditions or with increasing acceleration gradient or a more depressed accelerator pedal position. The probability that a regeneration has to be performed increases also with an increase in the actual or projected engine power.

The $NO_x$ storage capacity can also be considered for determining the need for regeneration, for example, in form of a normalized loading number. Altogether, the need for regeneration can be determined in such a way that it produces a characteristic value which is compared with a predetermined threshold value. If this characteristic value exceeds the threshold value, then the regeneration is initiated by a change into the stoichiometric or rich operating mode. Because the characteristic value depends on the aforementioned quantities, the need for regeneration can be determined based on the particular situation instead on the conventional inflexible definition.

Other preferred embodiments of the invention are recited as additional features in the dependent claims.

BRIEF DESCRIPTION OF THE DRAWINGS

The invention will be described hereinafter with reference to an embodiment to be read in conjunction with the appended drawings. It is shown in.

DETAILED DESCRIPTION OF THE PREFERRED EMBODIMENTS

Figure 1:
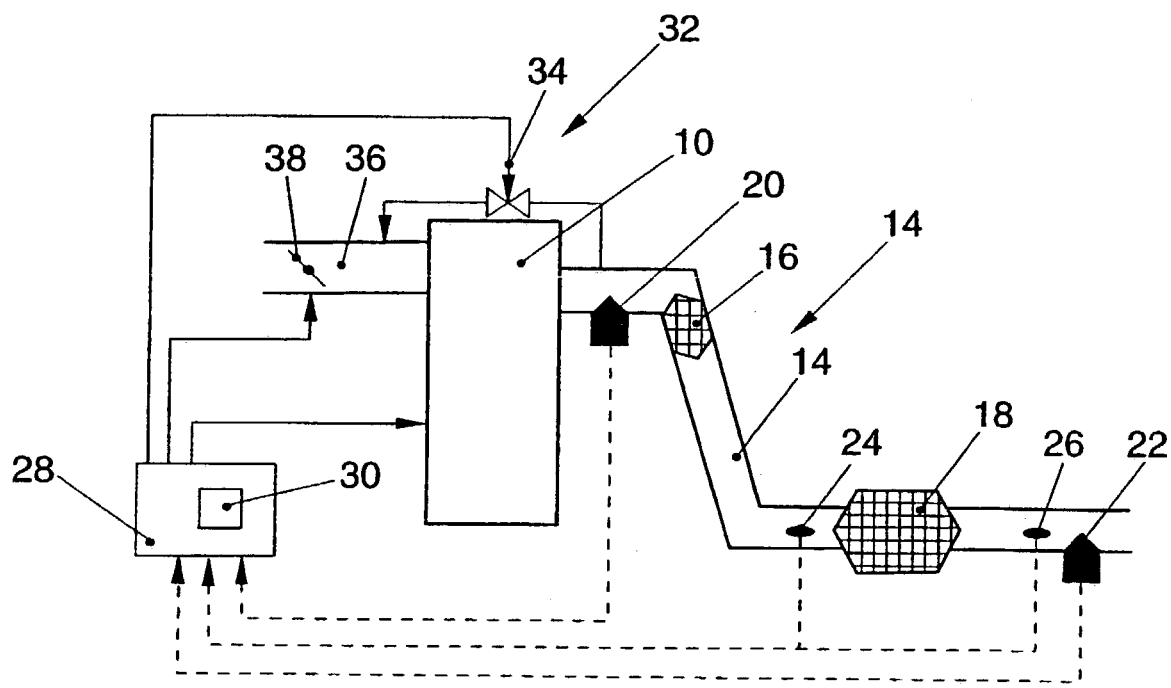
FIG. 1 a schematic diagram of an internal combustion engine with an exhaust gas cleaning device located in the exhaust channel.

FIG. 1 shows an internal combustion engine 10 which includes an exhaust gas cleaning device 14 in an exhaust channel 12. The exhaust gas cleaning device 14 includes components, such as a pre-catalyst 16 and a $NO_x$ storage catalyst 18. Also arranged in the exhaust channel 14 are sensors which allow the determination of the fractions of selected pollutants and/or an air-fuel ratio $\lambda$ and/or a temperature. The gas sensors 20, 22 can be implemented, for example, as $NO_x$ sensors or Lambda-Sensors. According to this embodiment, the temperature sensors 24, 26 provide an exhaust gas temperature upstream and downstream of the $NO_x$ storage catalyst 18. The signals from the sensors 20, 22, 24, 26 are transmitted in a conventional manner to an engine controller 28.

The engine controller 28 also includes a control device 30 which allows to determine—in a manner to be described below—a need for regeneration of the $NO_x$ storage catalyst 18. For this purpose, a corresponding process is stored in the control device 30 in digital form. It is understood that the control device 30 can also be implemented as a separate unit.

The engine controller 28 can also be used to affect the operating parameters of the internal combustion engine 10 in a known manner. For this purpose, corresponding models are stored in the engine controller 28 which define suitable control values for the adjustment devices associated with the internal combustion engine 10. An exemplary exhaust gas return device 32 is illustrated which allows control of the exhaust gas return flow through an exhaust gas return valve 34. A throttle valve 38 with a flap having a variable angle for adjusting a suction volume flow is disposed in a vacuum line 36. In particular, an air-fuel ratio $\lambda$ for an air-fuel mixture to be combusted can be adjusted via the exhaust gas return device 32 and the throttle flap 38 and an injection system (not shown).

Figure 2:
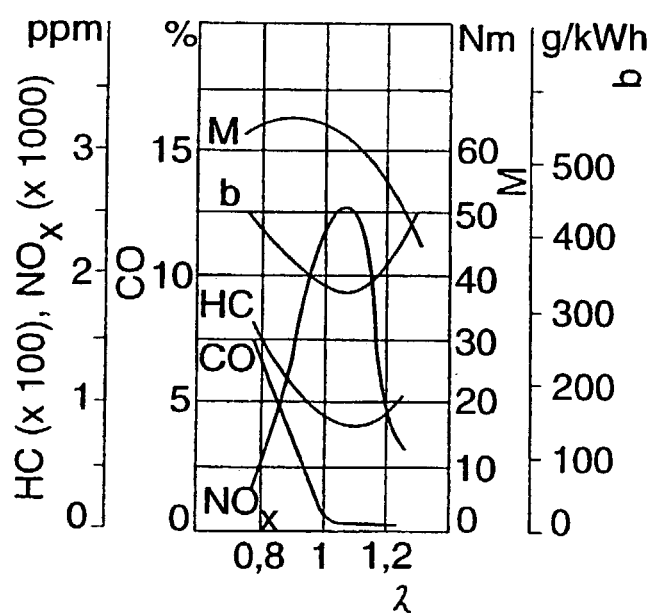
FIG. 2 diagrams of selected pollutants, torque and specific fuel consumption for a gasoline engine as a function of an air-fuel ratio.

FIG. 2 illustrates the influence of the air-fuel ratio $\lambda$ on a torque of the internal combustion engine 10, a specific fuel consumption b and the formation of selected pollutants. Although the internal combustion engine 10 is unable to develop a maximum torque M under conditions of approximately 1.1 which are optimized for fuel consumption, the produced torque M is still sufficient for most driving situations (the optimized consumption is empirically determined to be approximately $\lambda=1.1$ for gasoline engines, and can reach values of 4.5 for direct-injected engines and of 8 for Diesel engines). It is necessary to change to a drive-optimized range of approximately $\lambda=0.95$ to 0.98 only for heavy loads (for example, climbing mountain passes, heavy cargo) and strong acceleration (for example, kick-down). As a result, the emission of nitrous oxides $NO_x$ increases significantly when the internal combustion engine operates under lean-running conditions, whereas the emission of reducing pollutants, such as carbon monoxide CO and unburned hydrocarbons HC is relatively low. Under such conditions, the $NO_x$ in the pre-catalyst 16 and in the $NO_x$ storage catalyst 18, respectively, cannot be completely converted, and the $NO_x$ is only stored in the storage component of the $NO_x$ storage catalyst 18. Since the $NO_x$ storage catalyst 18 has a finite storage capacity, a changeover into a stoichiometric or rich operating mode is required in regular intervals for providing adequate reducing mass flows (HC and CO mass flows).

Figure 3:
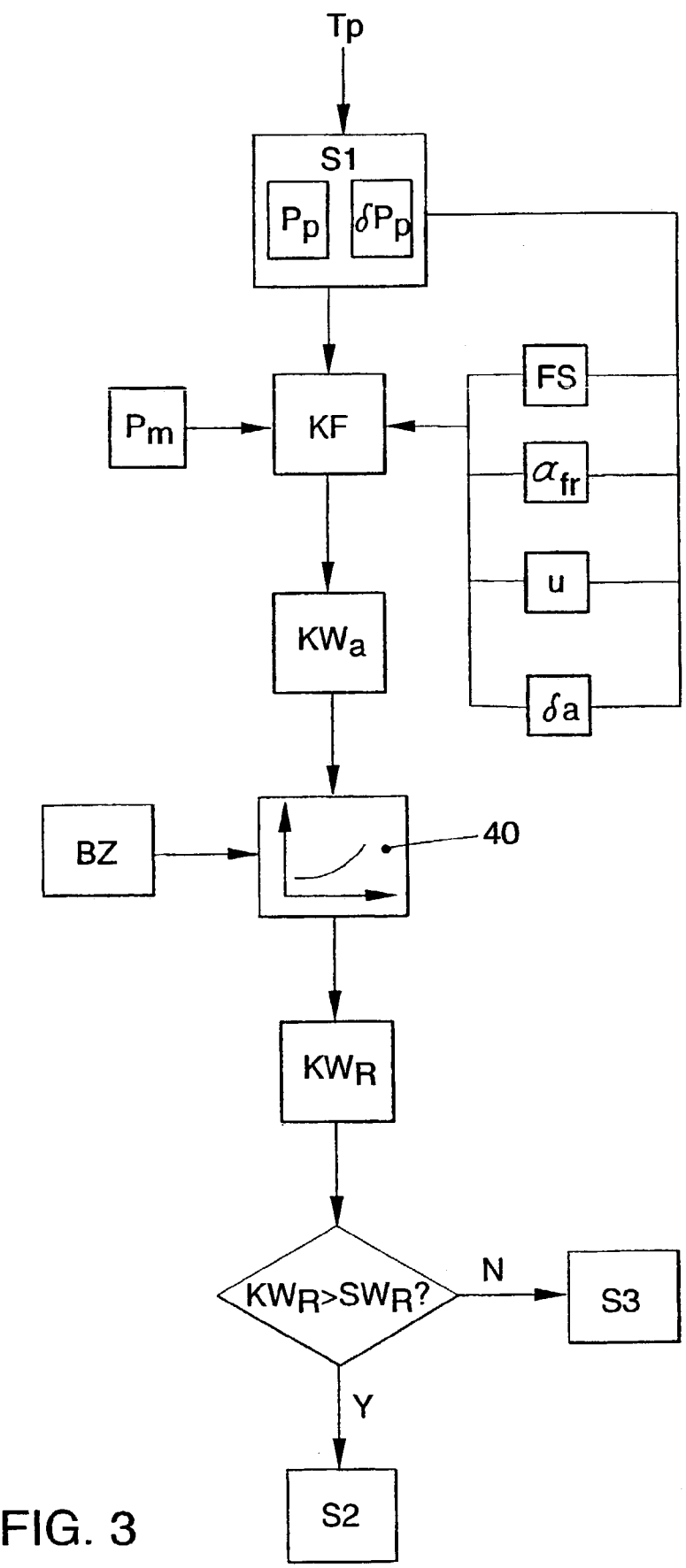
FIG. 3 a flow diagram for determining a need for regeneration.

A need for regeneration can be determined according to the flow diagram of FIG. 3. In general, the need for regeneration depends on an engine power P of the internal combustion engine 10 and a remaining $NO_x$ storage capacity of the $NO_x$ storage catalyst 18. Inclusion of other parameters has also proven advantageous.

The engine power P can be taken into consideration in form of an instantaneous engine power $P_m$. This can be based on known models which will not be discussed further.

In step S1, a projected engine power $P_p$ or a projected engine power gradient $\delta P_p$ is calculated for a predetermined time horizon $T_p$ using a predictive model. This model can consider other parameters aside from a torque history. Such parameter can be, for example, a driving situation FS which can be used to characterize, for example, an acceleration phase of the motor vehicle, preferably from a standing start. An accelerator pedal position $\alpha f_p$, an actual gear ratio u as well as an acceleration gradient $\delta a$ over an elapsed time interval $T_a$ can also be included in the model.

The aforedescribed parameters, i.e., the driving situation FS, the accelerator pedal position $\alpha f_p$, the gear ratio u, the acceleration gradient $\delta a$, the instantaneous engine power $P_{in}$, the projected engine power $P_p$ and the projected engine power gradient $\delta P_p$ are included in a parameter field KF, from which a parameter $KW_a$ is derived. The parameter $KW_a$ is hence a quantity that combines all parameters on the drive side.

The value of $KW_a$ is advantageously defined so as to increase with increasing engine power P, a more depressed accelerator pedal position $\alpha f_p$ and an increased acceleration gradient $\delta a$, which increases the probability for determining the need for regeneration in the following steps.

It is necessary to determine not only the drive-side parameters, but also the remaining $NO_x$ storage capacity of the $NO_x$ storage catalyst 18. This can again be accomplished by using known models for the $NO_x$ storage catalyst 18, with the input values of the models represented by signals provided by the sensors 20, 22, 24, 26. The $NO_x$ storage capacity can be provided for the additional evaluations, for example, in form of a loading number BZ that is normalized to a fresh $NO_x$ storage catalyst 18.

A parameter $KW_R$ for the need for regeneration can be determined from a characteristic curve 40 for the loading number BZ and the parameter $KW_a$. Advantageously, the value of the parameter $KW_R$ increases with increasing loading number BZ and/or increasing parameter $KW_a$.

In a subsequent query, the parameter $KW_R$ is compared with a predetermined threshold value $SW_R$. If the parameter $KW_R$ exceeds the threshold value $SW_R$, then a regeneration action is initiated in a subsequent step S2 by, for example, changing the throttle position or the exhaust gas return flow rate to achieve stoichiometric or rich conditions for the combustion of the air-fuel mixture. If the parameter $KW_R$ is equal to or less than the threshold value $SW_R$, then no action is taken (step S3).

It should be mentioned again at this point that the afore-described actions can modify the need for regeneration depending on the driving situation. For example, a relatively high value could be defined for the parameter $KW_R$ during a lean acceleration phase. This makes a need for regeneration more likely. This approach is particularly advantageous since the exhaust gas mass flows during an acceleration phase are greater than in the following, mostly constant driving phases. Accordingly, a change into the stoichiometric or rich operating mode would increase the mass flow of the reducing agents in comparison to the constant driving phase, which can shorten the entire regeneration phase.

The invention claimed is:

1. Method for determining a need for initiating regeneration of a $NO_x$ storage catalyst (18) which is arranged in an exhaust channel (12) of an at least temporarily lean-running combustion engine (10) for motor vehicles, wherein the need for initiating regeneration is determined as a function of:
   a remaining $NO_x$ storage capacity of the $NO_x$ storage catalyst (18);
   an instantaneous engine power (P) of the internal combustion engine (10); and
   at least one of a projected motor power gradient ($\delta_{P_p}$) during a predetermined time horizon $T_p$ and a projected motor power $P_p$ at the end of the redetermined time horizon ($T_g$).

2. Method claim 1, wherein the engine power (P) is taken into consideration in form of an instantaneous engine power ($P_m$) of the internal combustion engine (10).

3. Method according to claim 1, wherein for the determination there is also taken into consideration an acceleration gradient ($\delta a$) during a predetermined time interval ($T_a$).

4. Method according to claim 1, wherein for the determination there is also taken into consideration an accelerator pedal position ($\delta_{f_p}$).

5. Method according to claim 1, wherein for the determination there is also taken into consideration a gear ratio (u) of a gear.

6. Method according to claim 1, wherein for the determination there is also taken into consideration a driving situation (FS) of the motor vehicle.

7. Method according to claim 6, wherein the driving situation (FS) is a lean acceleration phase.

8. Method according to claim 1, wherein at least one of the projected engine power ($P_p$) and the projected engine power gradient ($\delta P_p$) are calculated using a model which takes into consideration a torque history, driving situation (FS), acceleration gradient ($\delta a$), accelerator pedal position ($\alpha_{t_p}$) and actual gear ratio (u).

9. Method according to claim 1, wherein a parameter ($KW_R$) is determined as a measure for the need for initiating regeneration, wherein the parameter ($KW_R$) increases with increasing engine power ($P_m$), increasing projected engine power ($P_p$) or increasing projected engine power gradient ($\delta P_p$).

10. Method according to claim 1, wherein a parameter ($KW_R$) is determined as a measure for the need for initiating regeneration, wherein the parameter ($KW_R$) increases with increasing acceleration gradient ($\delta a$) or with a more depressed accelerator pedal position ($\alpha_{t_p}$).

11. Device for determining a need for initiating regeneration of a $NO_x$ storage catalyst (18) which is arranged in an exhaust channel (12) of an at least temporarily lean-running combustion engine (10) for motor vehicles, wherein a control device (30) is provided in which a procedure for determining the need for initiating regeneration as a function of an engine power (P) of the internal combustion engine (10), a remaining $NO_x$ storage capacity of the $NO_x$ storage catalyst (18) and at least one of a projected motor power gradient ($\delta_{P_p}$) during a predetermined time horizon ($T_p$) and a projected motor power ($P_p$) at the end of the predetermined time horizon ($T_p$) is stored in digitized form.

12. Device according to claim 11, wherein the control device (30) is part of an engine controller (28).

13. The method of claim 7, wherein the lean acceleration phase is from a standing start.

* * * * *